United States Patent
Yamamoto et al.

(10) Patent No.: US 9,410,495 B2
(45) Date of Patent: Aug. 9, 2016

(54) DIESEL ENGINE CONTROL APPARATUS

(71) Applicant: Mitsubishi Heavy Industries, Ltd., Tokyo (JP)

(72) Inventors: Takayuki Yamamoto, Tokyo (JP); Tomohide Yamada, Tokyo (JP); Ko Takayanagi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/414,094

(22) PCT Filed: Oct. 25, 2012

(86) PCT No.: PCT/JP2012/077548
§ 371 (c)(1),
(2) Date: Jan. 9, 2015

(87) PCT Pub. No.: WO2014/064791
PCT Pub. Date: May 1, 2014

(65) Prior Publication Data
US 2015/0219032 A1    Aug. 6, 2015

(51) Int. Cl.
*F01N 3/00*    (2006.01)
*F01N 3/10*    (2006.01)
(Continued)

(52) U.S. Cl.
CPC ............ *F02D 41/1465* (2013.01); *F01N 3/208* (2013.01); *F01N 11/007* (2013.01);
(Continued)

(58) Field of Classification Search
CPC .............. F01N 11/007; F01N 2550/02; F01N 2610/02; F01N 2610/1453; F02B 3/06; F02D 41/027; F02D 41/1446; F02D 41/1461; F02D 41/1463; F02D 41/1465; F02M 25/0707; F02M 25/0718
USPC ............ 60/276, 277, 285, 301, 286, 295, 303
See application file for complete search history.

(56) References Cited

U.S. PATENT DOCUMENTS 6,892,530 B2 *  5/2005  Montreuil .............. B01D 53/90
                                                        60/274
7,617,672 B2 * 11/2009  Nishina ................. F01N 3/2066
                                                        60/277
(Continued)

FOREIGN PATENT DOCUMENTS

JP    2003-227378 A    8/2003
JP    2003301737 A    10/2003
(Continued)

OTHER PUBLICATIONS

PCT, Notification Concerning Transmittal of International Preliminary Report on Patentability, App. No. PCT/JP2012/077548, Filed Oct. 25, 2012, Mailed May 7, 2015, 5 Pages.
PCT, Notification of Transmittal of Translation of the International Preliminary Report on Patentability, App. No. PCT/JP2012/077548, Filed Oct. 25, 2012, Mailed May 7, 2015, 6 Pages.
International Search Report, App. No. PCT/JP2012/077548, Filed Oct. 25, 2012, Mailed Nov. 27, 2012, 3 Pages.
Notification of Receipt of Record Copy, App. No. PCT/JP2012/077548, Filed Oct. 25, 2012, Mailed Nov. 21, 2012, 1 Page.
(Continued)

*Primary Examiner* — Thomas Denion
*Assistant Examiner* — Diem Tran
(74) *Attorney, Agent, or Firm* — Berkeley Law & Technology Group, LLP

(57) ABSTRACT

An object is to provide a diesel engine control apparatus configured to evaluate the activation state of a SCR catalyst at high accuracy by means other than the temperature of the catalyst and to control engine control parameters so as to reduce the amount of NOx emission when the SCR catalyst is in a non-active state. The diesel engine control apparatus includes a diesel engine, an engine control unit, and an SCR catalyst. The engine control unit includes a parameter setting part configured to set engine control parameters; an operation control part configured to control an operation state of the diesel engine on the basis of the at least one engine control parameter; and a purification state determination part configured to determine a NOx purification state of the SCR catalyst. The parameter setting part is configured to set the engine control parameters so as to reduce the amount of NOx emission in the exhaust gas discharged from the diesel engine when the NOx purification state of the SCR catalyst determined by the purification state determination part is below a predetermined NOx purification state.

5 Claims, 9 Drawing Sheets

(51) Int. Cl.
*F02D 41/14* (2006.01)
*F01N 11/00* (2006.01)
*F02D 41/02* (2006.01)
*F01N 3/20* (2006.01)
*F02B 3/06* (2006.01)
*F02D 41/40* (2006.01)
*F02D 41/00* (2006.01)
*F01N 3/023* (2006.01)

(52) U.S. Cl.
CPC ........ *F02D41/0235* (2013.01); *F02D 41/1446* (2013.01); *F02D 41/1461* (2013.01); *F02D 41/1463* (2013.01); *F01N 3/023* (2013.01); *F01N 3/103* (2013.01); *F01N 2550/02* (2013.01); *F01N 2560/026* (2013.01); *F01N 2560/06* (2013.01); *F01N 2560/08* (2013.01); *F01N 2560/14* (2013.01); *F01N 2610/02* (2013.01); *F01N 2610/1453* (2013.01); *F01N 2900/1621* (2013.01); *F02B 3/06* (2013.01); *F02D 41/005* (2013.01); *F02D 41/1462* (2013.01); *F02D 41/401* (2013.01); *F02D 2250/31* (2013.01); *F02D 2250/36* (2013.01)

(56) References Cited

U.S. PATENT DOCUMENTS

| | | | | |
|---|---|---|---|---|
| 7,685,810 B2 * | 3/2010 | Hirata | ............... | F91N 3/2066 |
| | | | | 123/479 |
| 8,156,729 B2 * | 4/2012 | Sun | ............... | F01N 3/0231 |
| | | | | 60/274 |
| 8,495,862 B2 * | 7/2013 | Levijoki | ............ | F01N 3/208 |
| | | | | 60/274 |

FOREIGN PATENT DOCUMENTS

| | | |
|---|---|---|
| JP | 2005-120938 A | 5/2005 |
| JP | 2006037769 A | 2/2006 |
| JP | 2006-183511 A | 7/2006 |
| JP | 2006-200473 A | 8/2006 |
| JP | 2011241731 A | 12/2011 |
| JP | 2011241775 A | 12/2011 |
| JP | 2012159040 A | 8/2012 |

OTHER PUBLICATIONS

First Office Action & English Translation for Japanese App. No. 2014-543067, Issued Sep. 3, 2015, Mailed Sep. 11, 2015, 9 Pages.
JP 2014543067: Decision to grant patent, Feb. 26, 2016 with English Translation, 6 pages.

\* cited by examiner

DIESEL ENGINE CONTROL APPARATUS

TECHNICAL FIELD

The present disclosure relates to a diesel engine control apparatus including an selective catalytic reduction (SCR) catalyst for purifying NOx in exhaust gas.

BACKGROUND

A diesel engine control apparatus including an SCR catalyst for purifying NOx in exhaust gas has a problem in that the catalyst does not reach the activating temperature immediately after activation of the engine or when low-load operation at a low exhaust temperature is continued, which leads to a low trend of the NOx purification state of the catalyst and insufficiency in the NOx purification.

Patent Documents 1 to 4 (identified below) disclose techniques for controlling an operation state of an engine in accordance with the temperature of a catalyst. The techniques control various engine control parameters such as an exhaust gas recirculation (EGR) rate, a fuel injection pressure, or a fuel injection timing in order to control the engine, and especially, to improve the fuel consumption when the temperature of the catalyst has become the activating temperature.

Patent Document 1: Japanese Unexamined Patent Application No. 2003-301737
Patent Document 2: Japanese Unexamined Patent Application No. 2006-37769
Patent Document 3: Japanese Unexamined Patent Application No. 2006-200473
Patent Document 4: Japanese Unexamined Patent Application No. 2011-241775

SUMMARY

When controlling the operation state of an engine in accordance with the temperature of a catalyst, the accurate activation state of the catalyst cannot be evaluated if the measurement accuracy of the temperature of the catalyst is low. The temperature of the catalyst is normally obtained by the temperature of exhaust gas measured by a temperature sensor disposed in the vicinity of the catalyst. Thus, there is a gap between the measured temperature and the actual temperature of the catalyst.

At least one embodiment of the present invention was made in view of the problem of the conventional techniques. An object is to provide a diesel engine control apparatus configured to evaluate the activation state of a SCR catalyst at high accuracy by techniques other than the temperature of the catalyst, and to control engine control parameters so as to reduce the amount of NOx emission in a case where the SCR catalyst is in a non-active state.

At least one embodiment of the present invention provides a diesel-engine control apparatus including: a diesel engine; an engine control unit for controlling an operation state of the diesel engine; and an SCR catalyst for purifying NOx in exhaust gas discharged from the diesel engine. The engine control unit includes: a parameter setting part configured to set at least one engine control parameter of the diesel engine; an operation control part configured to control an operation state of the diesel engine on the basis of the at least one engine control parameter set by the parameter setting part; and a purification state determination part configured to determine a NOx purification state of the SCR catalyst. The parameter setting part is configured to set the at least one engine control parameter so as to reduce an amount of NOx emission in the exhaust gas discharged from the diesel engine when the NOx purification state of the SCR catalyst determined by the purification state determination part is below a predetermined NOx purification state.

The diesel engine control apparatus with the above configuration includes the purification state determination part for determining the NOx purification state of the SCR catalyst, and evaluates the activation state of the SCR catalyst by determining the NOx purification state of the SCR catalyst. When the NOx purification state of the SCR catalyst is below the predetermined NOx purification state, the parameter setting part sets the engine control parameters so as to reduce the amount of NOx emission of the exhaust gas discharged from the diesel engine. In this way, emission of a large amount of NOx to the outside while the SCR catalyst is in the non-active state is prevented in advance.

Further, in one embodiment of the present invention, the at least one engine control parameter includes at least one of an EGR rate, a fuel injection pressure, or a fuel injection timing.

With the above configuration, it is possible to reduce the combustion temperature and the amount of NOx emission by increasing the EGR rate (increasing the amount of recirculation of exhaust gas) when the NOx purification state of the SCR catalyst is below the predetermined NOx purification state. Further, it is possible to reduce the combustion temperature and the amount of NOx emission by reducing the fuel injection pressure and the combustion efficiency. Still further, it is possible to reduce the combustion temperature and the amount of NOx emission by retarding the fuel injection timing to reduce the combustion pressure.

Further, in one embodiment of the present invention, the purification state determination part is configured to determine the NOx purification state on the basis of a NOx purification rate of the SCR catalyst.

With the above configuration, it is possible to obtain the NOx purification state of the SCR catalyst as the NOx purification rate in a quantitative way, which makes it possible to evaluate the NOx purification state at high accuracy before setting the engine control parameters.

Further, in one embodiment of the present invention, the purification state determination part is configured to calculate the NOx purification rate of the SCR catalyst on the basis of NOx concentration of the exhaust gas at an upstream side and a downstream side of the SCR catalyst measured by NOx sensors to determine the NOx purification state on the basis of the calculated NOx purification rate.

With the above configuration, it is possible to accurately obtain the NOx purification rate of the SCR catalyst. Thus, it is possible to evaluate the NOx purification state accurately.

In one embodiment of the present embodiment, the engine control unit includes a NOx concentration estimation part configured to estimate NOx concentration of the exhaust gas discharged from the diesel engine on the basis of an engine rotation speed and an amount of fuel injection of the diesel engine. The purification state determination part is configured to calculate the NOx purification rate of the SCR catalyst on the basis of the NOx concentration estimated by the NOx concentration estimation part and the NOx concentration in the exhaust gas at a downstream side of the SCR catalyst measured by a NOx sensor to determine the NOx purification state on the basis of the calculated NOx purification rate.

With the above configuration, it is unnecessary to attach a NOx sensor at the upstream side of the SCR catalyst. Thus, it is possible to reduce the cost.

In one embodiment of the present invention, the diesel engine control apparatus further includes a urea-aqueous solution injecting device configured to inject a urea-aqueous solution into the exhaust gas at an upstream side of the SCR catalyst. The purification state determination part is configured to determine the NOx purification state on the basis of whether the urea-aqueous solution injecting device is injecting the urea-aqueous solution.

With the above configuration, it is possible to determine the NOx purification state on the basis of a very simple determination criterion of whether the urea-aqueous solution injecting device is injecting the urea-aqueous solution.

In one embodiment of the present invention, the engine control unit includes an elapsed-time counting part configured to count an elapsed time from activation of the diesel engine. The purification state determination part is configured to determine the NOx purification state on the basis of the elapsed time from the activation of the engine.

With the above configuration, it is possible to determine the NOx purification state on the basis of a very simple determination criterion of the elapsed time from the activation of the engine.

According to at least one embodiment of the present invention, it is possible to provide the diesel engine control apparatus capable of evaluating the activation state of the SCR catalyst at high accuracy by determining the NOx purification state of the SCR catalyst. The diesel engine control apparatus is also configured to control the engine control parameters so as to reduce the amount of NOx emission when the SCR catalyst is in the non-active state.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
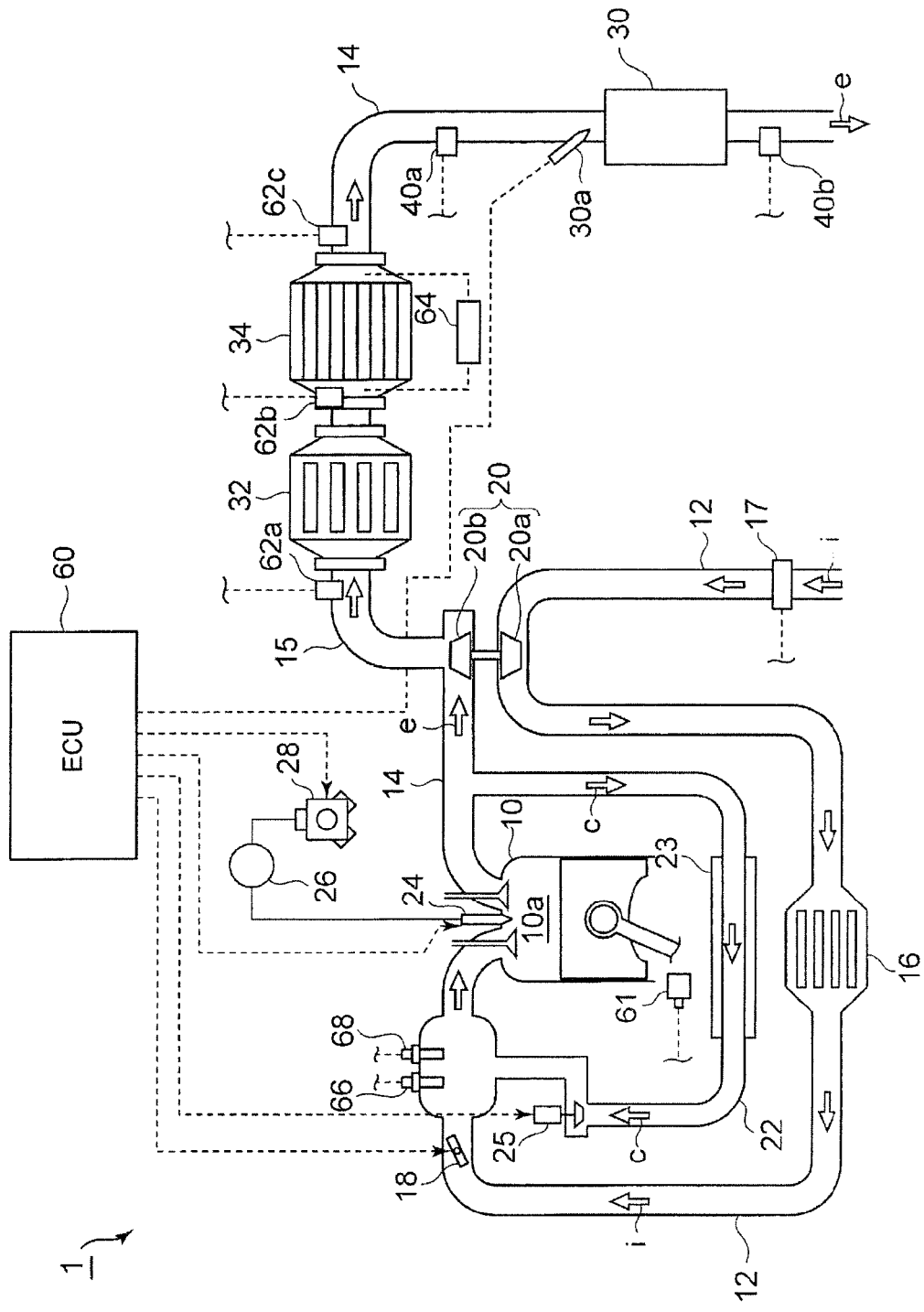
FIG. 1 is a block diagram of a system configuration of a diesel-engine control apparatus according to one embodiment of the present invention.

FIG. 1 is a block diagram of a system configuration of a diesel-engine control apparatus according to one embodiment of the present invention. First, an overall configuration of a diesel engine control apparatus 1 of the present embodiment will be described in reference to FIG. 1.

As illustrated in FIG. 1, the diesel-engine control apparatus 1 of the present embodiment includes a diesel engine 10, an engine control unit (hereinafter, referred to as "ECU") 60 for controlling the operation state of the diesel engine 10, an intake passage 12 for supplying intake gas (air) to the diesel engine 10, and an exhaust passage 14 through which exhaust gas discharged from the diesel engine 10 passes. Here, arrows "i", "e", and "c" in the drawing indicate the intake gas, the exhaust gas, and the flow direction of the re-circulating exhaust gas, respectively.

In the diesel engine 10, high-pressure fuel accumulated in a common rail 26 is injected into a combustion chamber 10a from a fuel injecting device 24. The high-pressure fuel is supplied to the common rail 26 from a supply pump 28. The ECU 60 controls the injection timing, injection pressure, and amount of injection for the fuel being injected into the combustion chamber 10a by transmitting control signals to the above fuel injecting device 24 and the supply pump 28. Further, a rotation speed sensor 61 is disposed in the diesel engine 10, and the engine rotation speed detected by the rotation speed sensor 61 is transmitted to the ECU 60.

A turbocharger 20 is disposed between the intake passage 12 and the exhaust passage 14. The turbocharger 20 includes an exhaust turbine 20b disposed on the exhaust passage 14 and a compressor 20a disposed on the intake passage 12. The compressor 20a and the exhaust turbine 20b are driven by the same shaft. The exhaust turbine 20b is rotated by the exhaust gas so that the compressor 20a rotates to compress the intake gas.

An intercooler 16 and a throttle valve 18 are disposed on the intake passage 12. The air compressed by the compressor 20a of the above turbocharger 20 is cooled by the intercooler 16 and then the flow rate of the air is controlled by the throttle valve 18, before flowing into the combustion chamber 10a of the diesel engine 10.

Further, an airflow meter 17 for measuring the amount of intake air is disposed on the upstream side of the intake passage 12. The amount of intake air measured by the airflow meter 17 is transmitted to the ECU 60. On the other hand, a temperature sensor 66 and a pressure sensor 68 are disposed on the downstream side of the throttle valve 18. The temperature and the pressure measured by the temperature sensor 66 and the pressure sensor 68, respectively, are transmitted to the ECU 60.

An SCR catalyst 30 for purifying NOx in the passing exhaust gas is disposed on the exhaust passage 14. Further, a urea-aqueous solution injecting device 30 is disposed on the upstream side of the SCR catalyst 30. The urea-aqueous solution injecting device 30 injects a urea-aqueous solution that is stored in a urea-aqueous solution tank (not illustrated) toward the exhaust passage 14 in response to the control signals from the ECU 60. The urea-aqueous solution injected into the exhaust passage 14 is hydrolyzed by the heat of the exhaust gas to produce ammonia ($NH_3$) which then serves as a reducing agent so that the NOx in the exhaust gas is reduced in the SCR catalyst 30.

Further, NOx sensors 40a, 40b for measuring the NOx concentration in the exhaust gas are disposed on the upstream and downstream sides of the SCR catalyst 30, respectively. The NOx concentration measured by the NOx sensors 40a, 40b is transmitted to the ECU 60.

Still further, a DOC catalyst 32 and a DPF device 34 are disposed on the upstream side of the SCR catalyst 30, which is also the downstream side of the exhaust turbine 20b of the turbocharger 20, in the exhaust passage 14. The DOC catalyst 32 has a function of oxidizing and removing the hydrocarbon (HC) and the carbon monoxide (CO) in the exhaust gas and oxidizing the nitrogen monoxide (NO) in the exhaust gas to produce nitrogen dioxide ($NO_2$). The DPF device 34 is disposed on the downstream side of the DOC device 32 to collect the exhaust particulate matters (PM) such as soot in the exhaust gas with a filter to remove the exhaust particulate matters from the exhaust gas.

Exhaust temperature sensors 62a, 62b, 62c for measuring a temperature of passing exhaust gas are disposed on the upstream and downstream sides of the above DOC catalyst 32 and the DPF device 34. A differential pressure sensor 64 for detecting a differential pressure between the upstream and downstream sides of the DPF device 34 is also provided. The measurement values of the exhaust temperature sensors 62a, 62b, 62c and the differential pressure sensor 64 are transmitted to the ECU 60.

Further, an EGR pipe 22 is branched from the upstream side of the exhaust turbine 20b of the exhaust passage 14 to connect to the intake passage 12 at the downstream side of the throttle valve 18. An EGR cooler 23 for cooling the passing exhaust gas and an EGR valve for opening and closing the EGR pipe 22 are disposed on the EGR pipe 22. The EGR valve 25 is controlled to be opened and closed so that a part of the exhaust gas discharged from the engine 1 is re-circulated to the diesel engine 1 through the EGR pipe 22. Also at this time, control signals are transmitted to the throttle valve 18 and the EGR valve 25 from the ECU 60 to control the opening degrees of the throttle valve 18 and the EGR valve 25, thereby controlling the rate (EGR rate) of the amount of recirculation of the exhaust gas to the amount of intake gas including the amount of recirculation.

Figure 2:
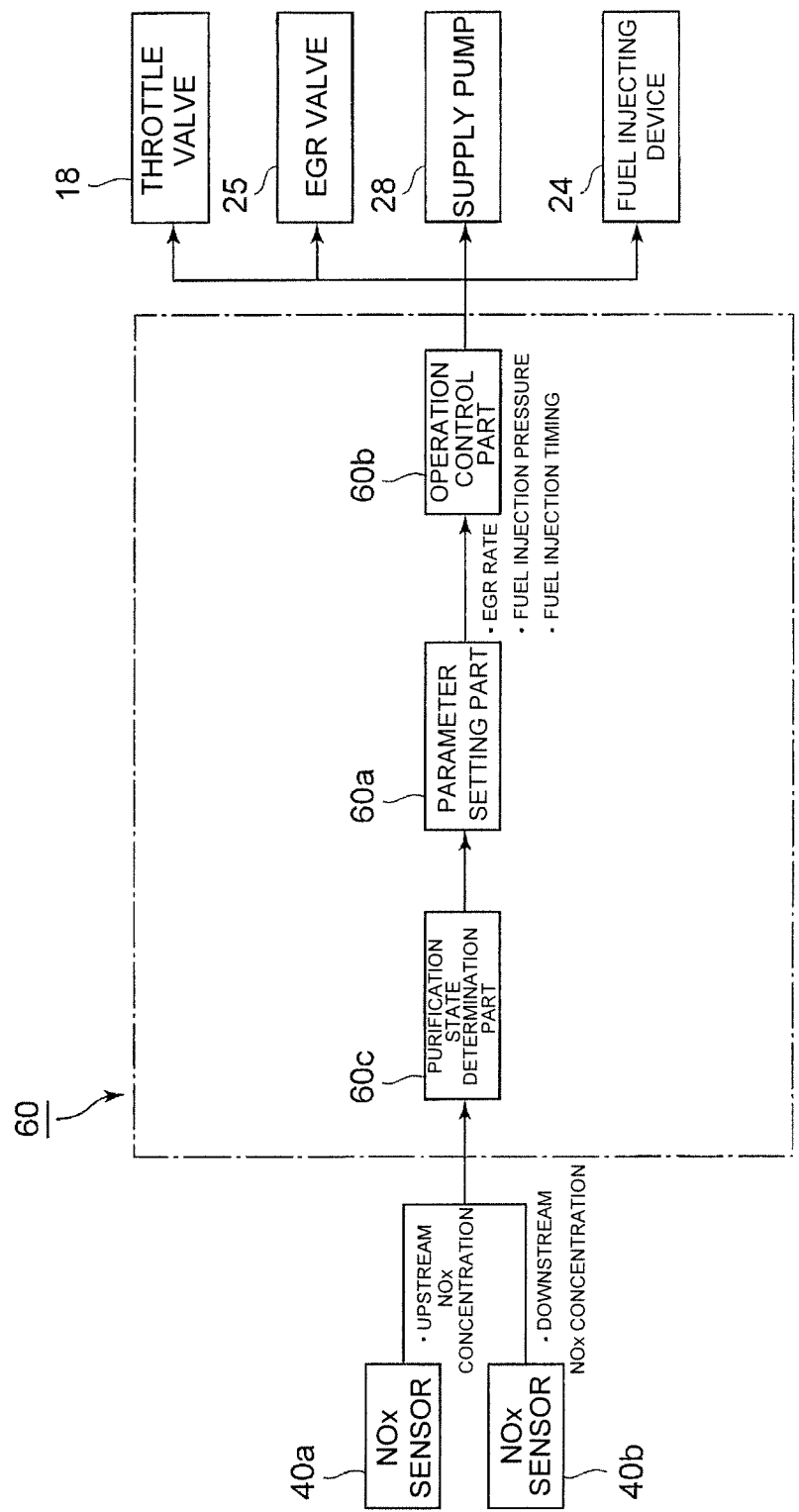
FIG. 2 is a block diagram of a configuration of an ECU according to one embodiment of the present invention.

Next, the configuration of the ECU 60 of the present embodiment will be described in reference to FIG. 2. FIG. 2 is a block diagram of a configuration of an ECU according to one embodiment of the present invention.

As illustrated in FIG. 2, the ECU 60 of the present embodiment at least includes a parameter setting part 60a for setting engine control parameters for the diesel engine 10, an operation control part 60b for controlling the operation state of the diesel engine 10 on the basis of the various engine control parameters set by the parameter setting part 60a, and a purification state determination part 60c for determining the NOx purification state of the SCR catalyst 30.

The parameter setting part 60a sets engine control parameters such as the EGR rate, the fuel injection pressure, or the injection timing so as to reduce the amount of NOx emission in the exhaust gas discharged from the diesel engine 10 when the NOx purification state of the SCR catalyst 30 determined by the purification state determination part 60c is below a predetermined NOx purification state. On the other hand, the parameter setting part 60a sets the various engine control parameters so as to achieve improvement of fuel consumption or reduction of the particulate matters (PM) discharged from the diesel engine 10 when the NOx purification state of the SCR catalyst 30 is above the predetermined NOx purification state.

Figure 3:
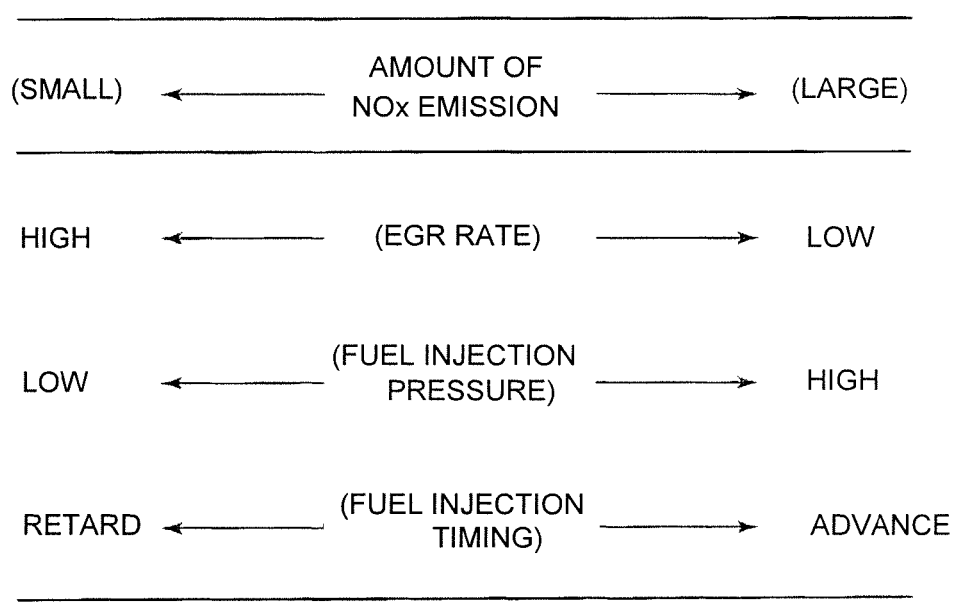
FIG. 3 is an illustrative diagram of a relationship between various engine control parameters and the amount of NOx emission.

Now, the relationship between the various engine control parameters and the amount of NOx emission is illustrated in FIG. 3. As illustrated in the drawing, the amount of NOx emission decreases by increasing the EGR rate (increasing the amount of recirculation of the exhaust gas), reducing the fuel injection pressure, and retarding the fuel injection timing. This is because, while the amount of NOx emission tends to decrease with a decrease in the combustion temperature, increasing the EGR rate leads to a decrease in the amount of oxygen in the combustion chamber 10a and thereby reduces the combustion temperature. Further, reducing the fuel injection pressure leads to an increase in the size of the sprayed oil drops and a decrease in the spraying speed, thereby reducing the combustion efficiency and therefore the combustion temperature. Still further, retarding the fuel injection timing leads to a decrease in the combustion pressure, thereby reducing the combustion temperature.

On the other hand, when the fuel injection pressure is increased or the fuel injection timing is advanced, the fuel efficiency increases for reasons opposite to the above. Thus, it is possible to achieve reduction of the amount of PM emission and improvement of the fuel consumption.

Thus, the parameter setting part 60a sets the engine control parameters so as to increase the EGR rate, reduce the fuel injection pressure, and retard the fuel injection timing when the NOx purification state of the SCR catalyst 30 is below a predetermined NOx purification state. On the other hand, the parameter setting part 60a sets the engine control parameters so as to reduce the EGR rate, increase the fuel injection pressure, and advance the fuel injection timing when the NOx purification state of the SCR catalyst 30 is above the predetermined NOx purification state.

Figure 4A:
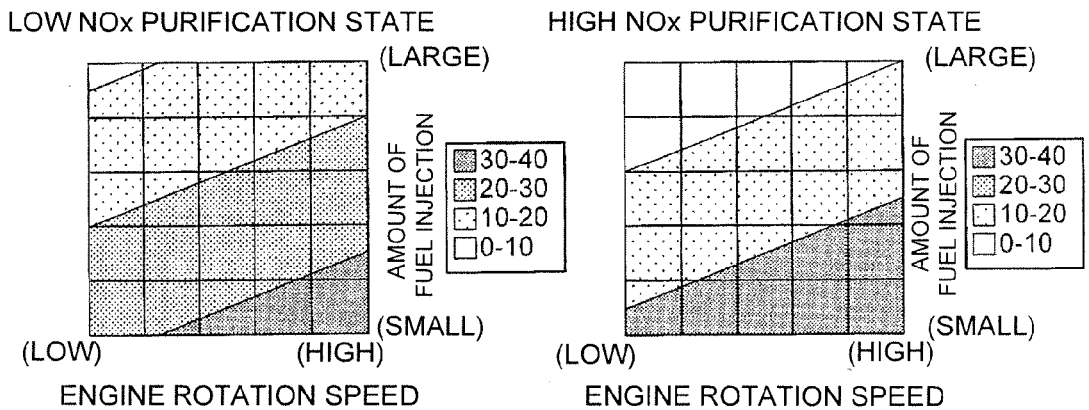
FIGS. 4A to 4C are control maps related to the various engine control parameters.
Figure 4B:
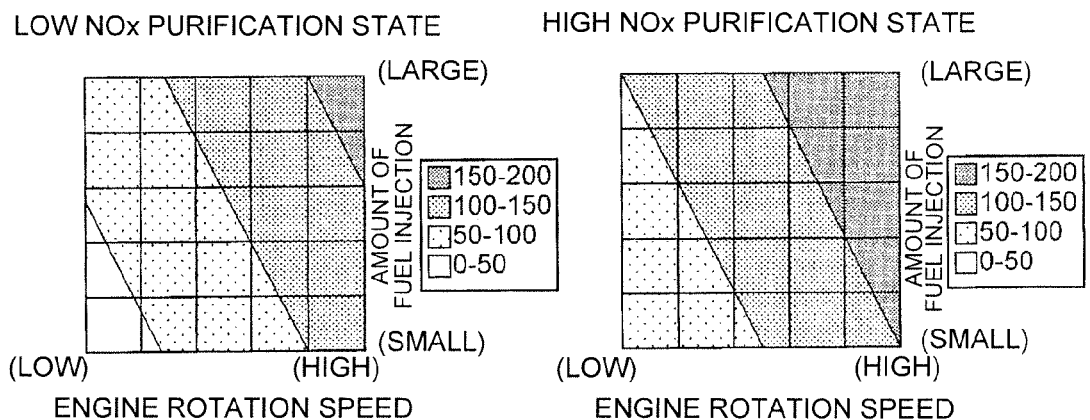
Figure 4C:
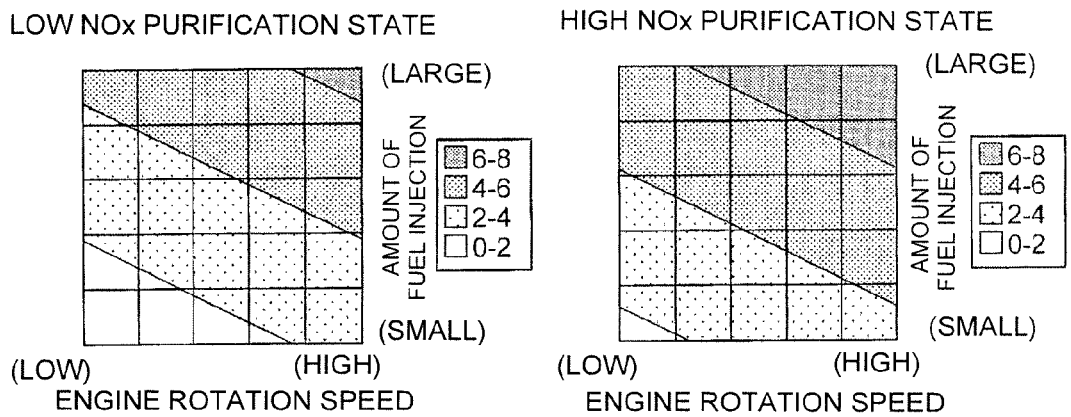

Further, the parameter setting part 60a stores control maps related to the various engine control parameters in advance. These control maps output various engine control parameters such as a target EGR rate, a fuel injection pressure, and a fuel injection timing, using the engine rotation speed and the amount of fuel injection as the input variables. A plurality of these control maps are prepared corresponding to the NOx purification state of the SCR catalyst 30. In the present embodiment, as illustrated in FIG. 4, two control maps associated with the low NOx purification state and the high NOx purification state are prepared for each engine control parameter. Then, the parameter setting part 60a inputs the engine rotation speed and the amount of fuel injection to the control map corresponding to the NOx purification state of the SCR catalyst 30 to output and transmit engine control parameters to the operation control part 60b.

The operation control part 60b transmits control signals to the throttle valve 18, the EGR valve 25, the supply pump 28, and the fuel injecting device 24 so as to achieve the engine control parameters transmitted from the parameter setting part 60a. Then, the opening degrees of the throttle valve 18 and the EGR valve 25 are controlled to achieve the target EGR rate transmitted from the parameter setting part 60a. Further, the supply pressure of the supply pump 28 and the injection timing of the fuel injecting device 24 are controlled to achieve the fuel injection pressure and the fuel injection timing transmitted from the parameter setting part 60a.

The purification state determination part 60c compares the NOx purification rate of the SCR catalyst 30 with predetermined threshold values to determine the NOx purification state of the SCR catalyst 30. The purification rate of the SCR catalyst 30 can be, for instance, calculated from the NOx concentration at the upstream and downstream sides of the SCR catalyst 30 transmitted from the NOx sensors 40a, 40b. As the threshold values of the NOx purification state, a threshold value A and a threshold value B that is a higher purification rate than the threshold value A are set in advance. Then, the SCR catalyst 30 is determined to be in the low NOx purification state when the NOx purification rate calculated from the measurement values of the NOx sensors 40a, 40b is not greater than the threshold value A. On the other hand, the SCR catalyst 30 is determined to be in the high NOx purification state when the NOx purification rate is not less than the threshold value B.

The above described parameter setting part 60a sets the engine control parameters on the basis of the control maps for the low NOx state when the SCR catalyst 30 is determined to be in the low NOx purification state by the purification state determination part 60c. On the other hand, the parameter setting part 60a sets the engine control parameters on the basis of the control maps for the high NOx state when the SCR catalyst 30 is determined to be in the high NOx purification state. Further, when the calculated NOx purification rate is in a range from the threshold value A to the threshold value B, two control maps are complemented to calculate the engine control parameters by calculating proportions.

The diesel-engine control apparatus 1 of the present embodiment with the above configuration includes the purification state determination part 60c for determining the NOx purification state of the SCR catalyst 30, and evaluates the activation state of the SCR catalyst 30 by determining the NOx purification state of the SCR catalyst 30. When the NOx purification state of the SCR catalyst 30 is in the low NOx purification state, the parameter setting part 60a sets the engine control parameters so as to reduce the amount of NOx emission in the exhaust gas discharged from the diesel engine 10. In this way, emission of a large amount of NOx to the outside while the SCR catalyst 30 is in the non-active state is prevented in advance.

Further, when the NOx purification state of the SCR catalyst 30 is in the high NOx purification state, the parameter setting part 60a sets the engine control parameters so as to achieve reduction of the amount of PM emission and the improvement of fuel consumption. With the above diesel-engine control apparatus 1 of the present embodiment, it is possible to restrict the amount of NOx emission, and to balance the reduction of the amount of PM emission and the improvement of fuel consumption.

Still further, in the above embodiment, the purification state determination part 60c determines the NOx purification state of the SCR catalyst 30 on the basis of the NOx purification rate. In this way, it is possible to obtain the NOx purification state of the SCR catalyst 30 as the NOx purification rate in a quantitative way, which makes it possible to evaluate the NOx purification state accurately before setting the engine control parameters.

At this time, it is also possible to accurately obtain the NOx purification state of the SCR catalyst 30 by calculating the NOx purification rate of the SCR catalyst 30 from the NOx concentration measured by the NOx sensors 40a, 40b disposed on the upstream and downstream sides of the SCR catalyst 30. Thus, it is possible to evaluate the NOx purification state accurately as compared to the following embodiment.

Figure 5:
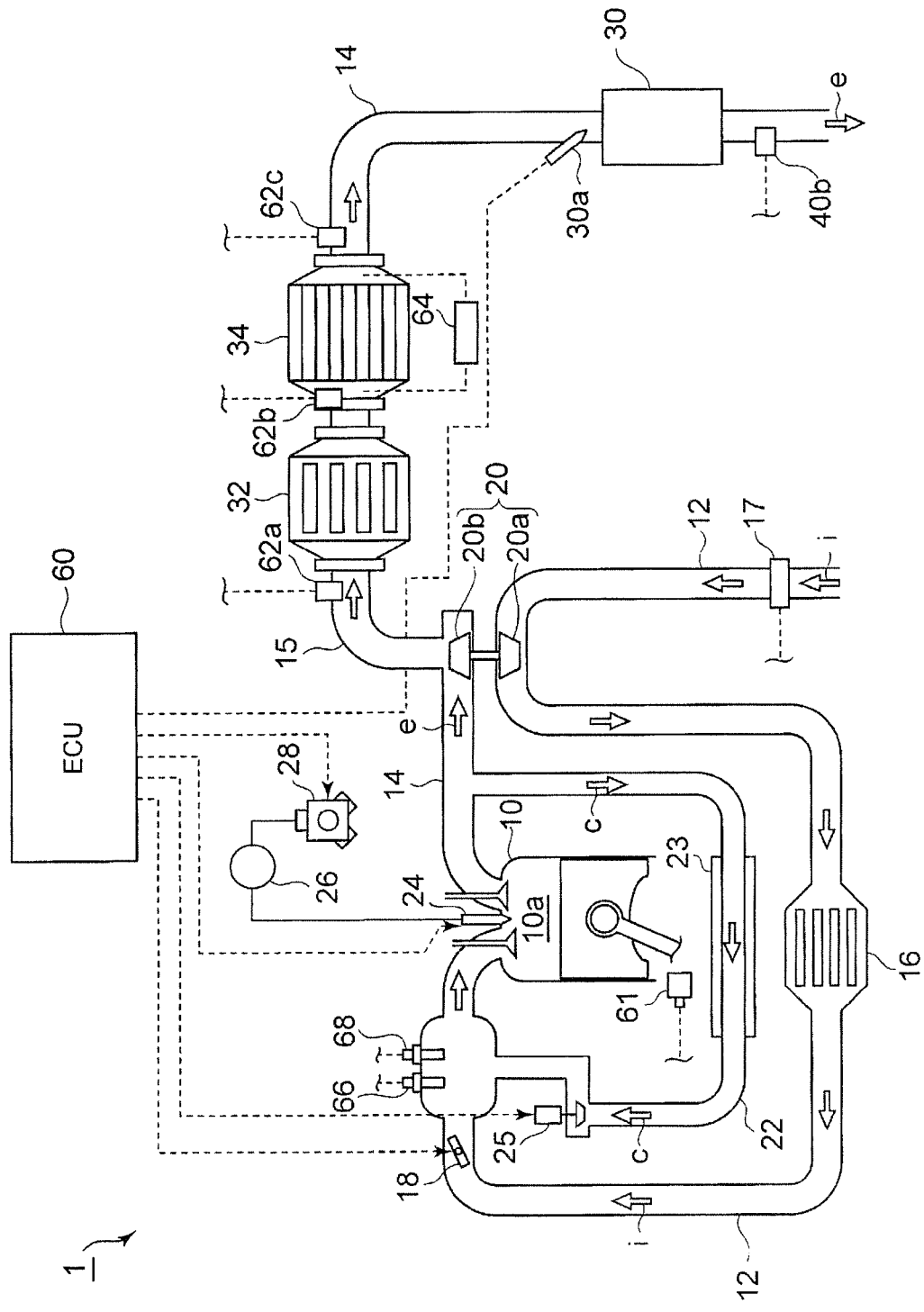
FIG. 5 is a block diagram of a system configuration of a diesel-engine control apparatus according to one embodiment of the present invention.
Figure 6:
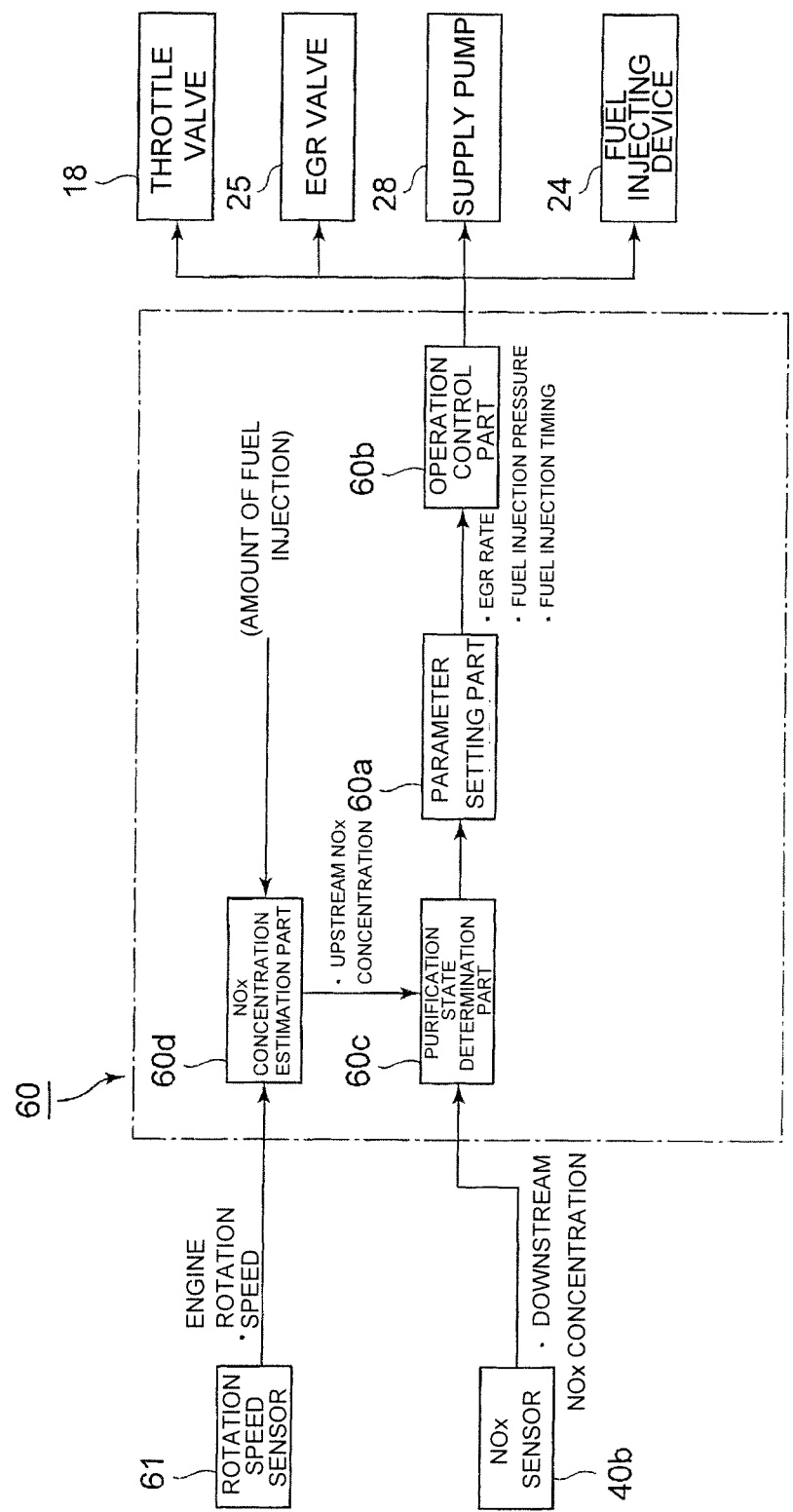
FIG. 6 is a block diagram of a configuration of an ECU according to one embodiment of the present invention.

FIG. 5 is a block diagram of a system configuration of a diesel-engine control apparatus according to one embodiment of the present invention. FIG. 6 is a block diagram of a configuration of an ECU according to one embodiment of the present invention. The diesel engine control apparatus 1 of the present embodiment basically has the same configuration as that of the above described embodiment. Thus, the same components are indicated by the same reference signs in accordance with the previous detailed description.

The diesel-engine control apparatus 1 of the present embodiment does not include the NOx sensor 40a on the upstream side of the SCR catalyst 30, as illustrated in FIG. 5. Another difference from the above embodiment is that the ECU 60 includes a NOx concentration estimation part 60d instead, as illustrated in FIG. 6.

Figure 7:
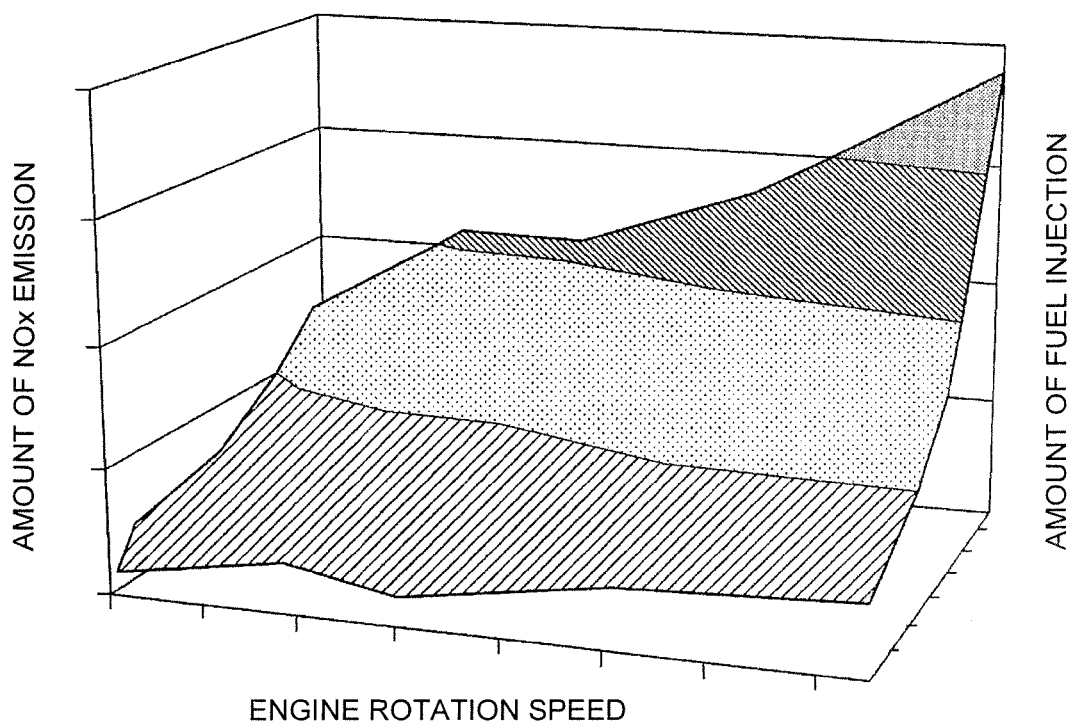
FIG. 7 is a diagram illustrating a map of the amount of NOx emission according to one embodiment of the present invention.

The NOx concentration estimation part 60d stores a map of the amount of NOx emission illustrated in FIG. 7. When the engine rotation speed and the amount of fuel injection are inputted into this map of the amount of NOx emission, the amount of NOx emission from the diesel engine 10 is calculated. The NOx concentration estimation part 60d estimates the NOx concentration of the exhaust gas discharged from the diesel engine 10 on the basis of the amount of NOx emission calculated from the map of the amount of NOx emission and the amount of intake gas supplied to the combustion chamber 10.

The NOx concentration estimated by the NOx concentration estimating part 60d is transmitted to the above purification state determination part 60c. In the present embodiment, the purification state determination part 60c determines the NOx purification state on the basis of the NOx concentration estimated by the NOx concentration estimation part 60d and the NOx concentration measured by the NOx sensor 40b at the downstream side of the SCR catalyst 30.

According to the present embodiment, it is possible to obtain the NOx purification state of the SCR catalyst 30 as the NOx purification rate in a quantitative way, similarly to the above embodiment. Thus, it is possible to evaluate the NOx purification state accurately before setting the engine control parameters. It is also possible to reduce the cost because it is unnecessary to attach the NOx sensor 40a to the upstream side of the SCR catalyst 30.

Figure 8:
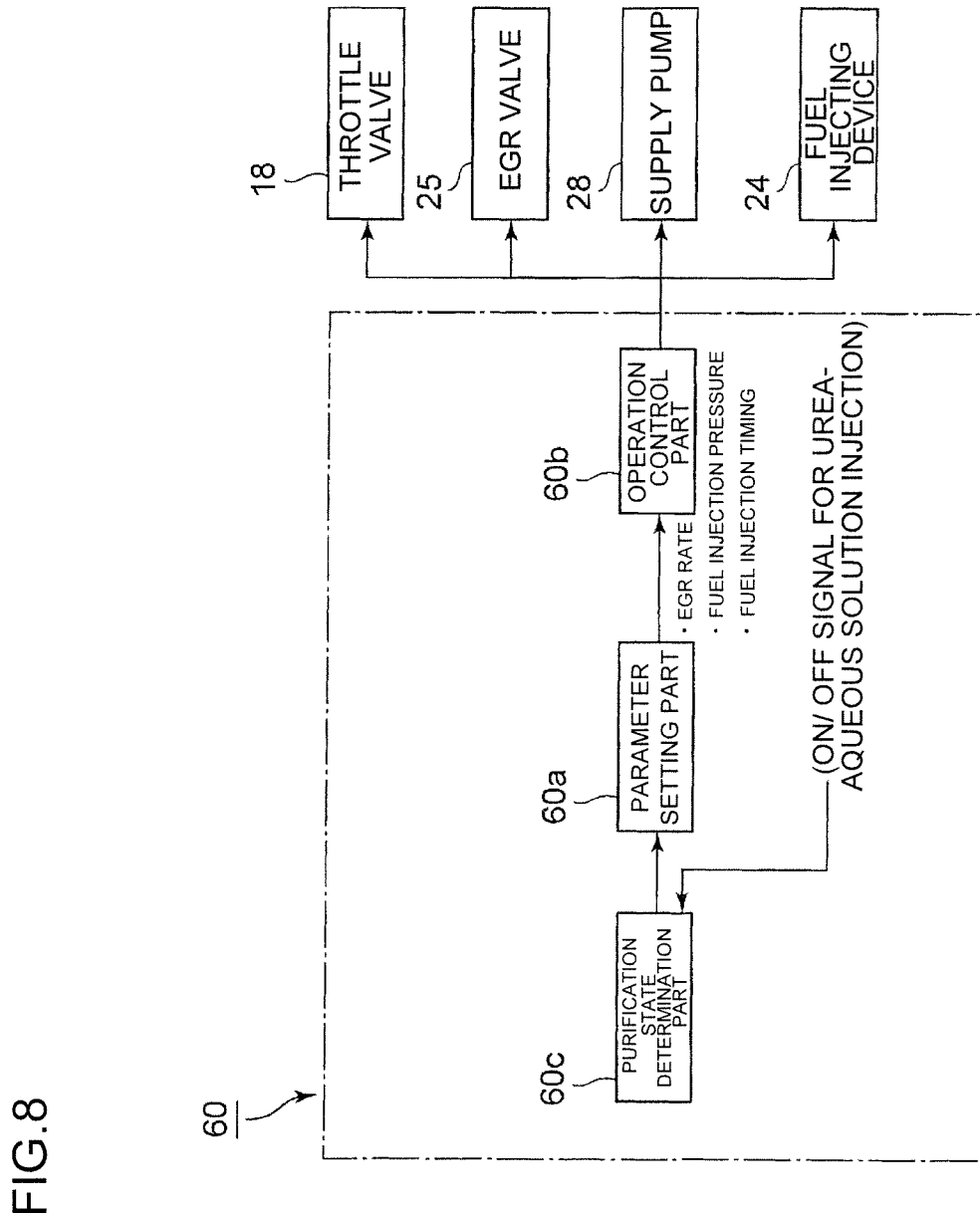
FIG. 8 is a block diagram of a configuration of an ECU according to one embodiment of the present invention.

FIG. 8 is a block diagram of a configuration of an ECU according to one embodiment of the present invention. The diesel engine control apparatus 1 of the present embodiment basically has the same configuration as those of the above described embodiments. Thus, the same components are indicated by the same reference signs in accordance with the previous detailed description.

The present embodiment is different from the above embodiments in that ON/OFF signals for urea-aqueous solution injection that are transmitted to the urea-aqueous solution injecting device 30a from the ECU 60 are also transmitted to the purification state determination part 60c. Another difference is that the purification state determination part 60c determines the NOx purification state on the basis of whether the urea-aqueous solution injecting device 30 is injecting the urea-aqueous solution.

That is, the purification state determination part 60c of the present embodiment determines that the SCR catalyst 30 is in the high NOx purification state while the urea-aqueous injecting device 30a is injecting the urea-aqueous solution. On the other hand, it determines that the SCR catalyst 30 is in the low NOx purification state while the urea-aqueous injecting device 30a is not injecting the urea-aqueous solution. The parameter setting part 60a sets the engine control parameters on the basis of the control maps corresponding to the two-stage NOx purification state including high and low states determined in the purification state determination part 60c.

The present embodiment determines the NOx purification state of the SCR catalyst on the basis of a very simple determination criterion of whether the urea-aqueous solution injecting device 30a is injecting the urea-aqueous solution. Thus, it is possible to determine the NOx purification state with a simplified system configuration that does not require the NOx sensors 40a, 40b or the NOx concentration estimation part 60d in the ECU 60.

Figure 9:
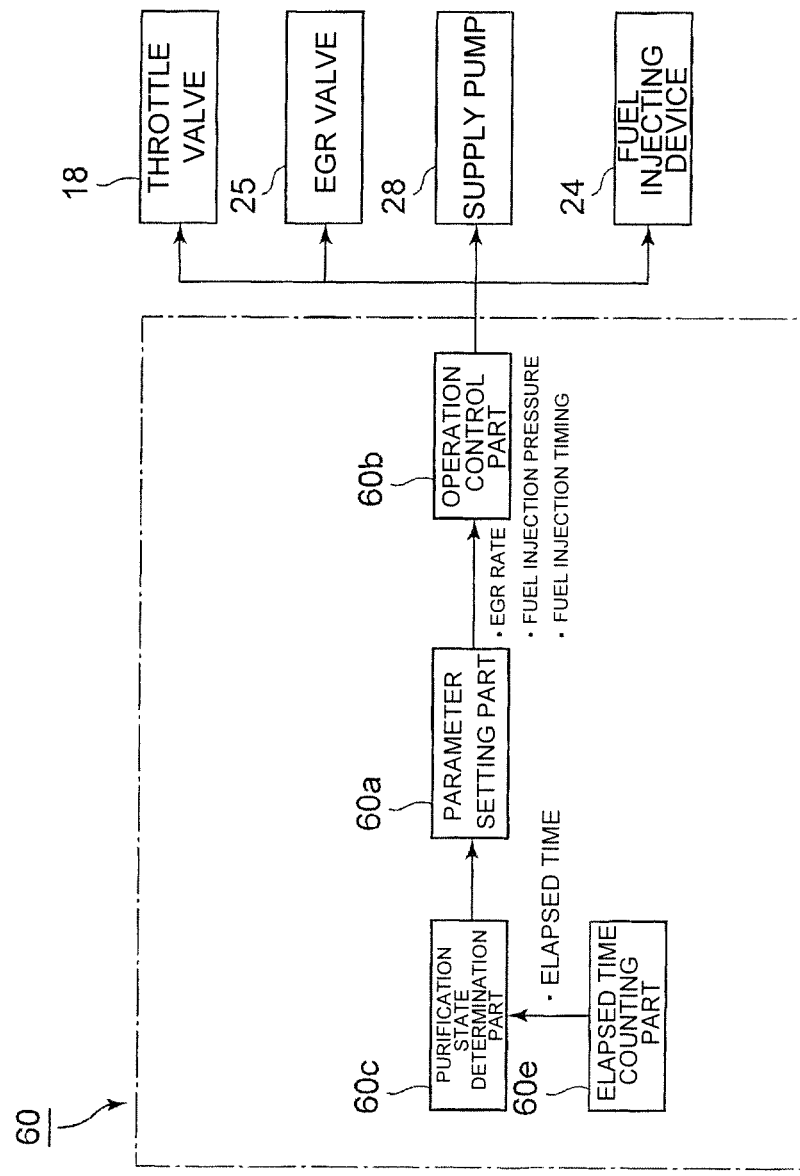
FIG. 9 is a block diagram of a configuration of an ECU according to one embodiment of the present invention.

FIG. 9 is a block diagram of a configuration of an ECU according to one embodiment of the present invention. The diesel engine control apparatus 1 of the present embodiment basically has the same configuration as those of the above described embodiments. Thus, the same components are indicated by the same reference signs in accordance with the previous detailed description.

The present embodiment is different from the above embodiments in that the ECU 60 includes an elapsed-time counting part 60e for counting an elapsed time from the activation of the engine. The elapsed time from the activation of the engine counted by the elapsed-time counting part is transmitted to the above purification state determination part 60c. Then, the purification state determination part 60c determines the NOx purification state on the basis of the elapsed time from the activation of the engine.

Until a predetermined time elapses after activation of the engine, the temperature of the discharged exhaust gas is low and thus it may be considered that the SCR catalyst 30 does not reach the activating temperature. On the other hand, the temperature of the exhaust gas rises and the SCR catalyst 30 may reach the activating temperature after the elapse of the predetermined time from the activation of the engine. Thus, it is possible to determine the NOx purification state with a very simple determination factor of the elapsed time from the activation of the engine by setting in advance a predetermined time in which the SCR catalyst 30 reaches the activating temperature corresponding to the type and usage of the diesel engine 10, and by determining the NOx purification state using this predetermined time set in advance as a threshold value.

The present embodiment may be especially suitable when applied to an engine that is operated in a mode within a constant range of load for a predetermined period of time after activation of the engine, for instance, as an engine for power generation.

Embodiments of the present invention were described in detail above, but the present invention is not limited thereto, and various amendments and modifications may be implemented within a scope that does not depart from the present invention.

At least one embodiment of the present invention may be suitably applied to a diesel engine control apparatus used in a generator, an industrial vehicle such as a construction machine, a forklift, or the like.

The invention claimed is:

1. A diesel-engine control apparatus, comprising:
   a diesel engine;
   an engine control unit to control an operation state of the diesel engine; and
   a selective catalytic reduction (SCR) catalyst to purify NOx in exhaust gas discharged from the diesel engine,
   wherein the engine control unit is to include:
      a parameter setting part to set at least one engine control parameter of the diesel engine;
      an operation control part to control an operation state of the diesel engine on the basis of the at least one engine control parameter to be set by the parameter setting part; and
      a purification state determination part to calculate a NOx purification rate of the SCR catalyst;
      the at least one engine control parameter to comprise three engine control parameters, which are an EGR rate, a fuel injection pressure, and a fuel injection timing,
      the parameter setting part to store two control maps to use an engine rotation speed and an amount of fuel injection as input variables and to provide the engine control parameter for each engine control parameter in advance, the two control maps to comprise a first control map for a relatively high NOx purification state and a second control map for a relatively low NOx purification state, the first control map to be applied if the NOx purification rate of the SCR catalyst is not less than a first threshold, the second control map to be applied if the NOx purification rate of the SCR catalyst is not greater than a second threshold, the second threshold to be a lower purification rate than the first threshold and to provide the engine control parameter so as to reduce an amount of NOx emission in the exhaust gas to be discharged from the diesel engine, and
      the parameter setting part to:
         set the at least one engine control parameter of the diesel engine based, at least in part, on the engine control parameter to be provided by the first control map if the NOx purification rate to be calculated by the purification state determination part is not less than the first threshold;
         set the engine control parameter of the diesel engine based, at least in part, on the engine control parameter to be provided by the second control map if the NOx purification rate to be calculated by the purification state determination part is not greater than the second threshold; and
         set the engine control parameter of the diesel engine based, at least in part, on the engine control parameter via a calculation of proportions to use the engine parameter to be provided by the first control map and the engine parameter to be provided by the second control map if the NOx purification rate to be calculated by the purification state determination part to comprise a range from the second threshold to the first threshold.

2. The diesel-engine control apparatus according to claim 1,
   wherein the purification state determination part is to calculate the NOx purification rate of the SCR catalyst on the basis of NOx concentration of the exhaust gas at an upstream side and a downstream side of the SCR catalyst measured by NOx sensors to determine the NOx purification state based, on the to be calculated NOx purification rate.

3. The diesel-engine control apparatus according to claim 1,
   wherein the engine control unit is to comprise a NOx concentration estimation part to estimate NOx concentration of the exhaust gas to be discharged from the diesel engine based, on an engine rotation speed and an amount of fuel injection of the diesel engine, and
   wherein the purification state determination part is to calculate the NOx purification rate of the SCR catalyst based, on the NOx concentration to be estimated by the NOx concentration estimation part and the NOx concentration in the exhaust gas at a downstream side of the SCR catalyst to be measured by a NOx sensor to determine the NOx purification state based, on the to be calculated NOx purification rate.

4. The diesel-engine control apparatus according to claim 1, further comprising
   a urea-aqueous solution injecting device to inject a urea-aqueous solution into the exhaust gas at an upstream side of the SCR catalyst,
   wherein the purification state determination part is to determine the NOx purification state based, on whether the urea-aqueous solution injecting device is to inject the urea-aqueous solution.

5. The diesel-engine control apparatus according to claim 1,
   wherein the engine control unit is to comprise an elapsed-time counting part to count an elapsed time from activation of the diesel engine, and wherein the purification state determination part is to determine the NOx purification state based, on the elapsed time from the activation of the engine.

* * * * *